US008066835B2

(12) United States Patent
Vetter et al.

(10) Patent No.: US 8,066,835 B2
(45) Date of Patent: Nov. 29, 2011

(54) METHOD AND APPARATUS FOR THE PRODUCTION OF MITERED CORNER JOINTS BY VIBRATION WELDING

(75) Inventors: Jörg Vetter, Münster (DE); Peter Eugster, Weiningen (CH); Beat Bruderer, Zürich (CH)

(73) Assignees: Branson Ultraschall (DE); Fentech AG (CH)

( * ) Notice: Subject to any disclaimer, the term of this patent is extended or adjusted under 35 U.S.C. 154(b) by 113 days.

(21) Appl. No.: 12/518,952

(22) PCT Filed: Dec. 11, 2007

(86) PCT No.: PCT/EP2007/010826
§ 371 (c)(1),
(2), (4) Date: Oct. 21, 2009

(87) PCT Pub. No.: WO2008/071395
PCT Pub. Date: Jun. 19, 2008

(65) Prior Publication Data
US 2010/0071834 A1 Mar. 25, 2010

(30) Foreign Application Priority Data
Dec. 12, 2006 (EP) .................................. 06025673

(51) Int. Cl.
*B32B 37/00* (2006.01)
(52) U.S. Cl. ........................ 156/73.5; 156/580
(58) Field of Classification Search ............... 156/73.5, 156/73.6, 304.1, 304.2, 304.5, 304.6, 580; 264/68; 228/112.1, 2.1
See application file for complete search history.

(56) References Cited

U.S. PATENT DOCUMENTS

| | | | |
|---|---|---|---|
| 5,902,657 A * | 5/1999 | Hanson et al. | 428/36.92 |
| 6,604,668 B2 | 8/2003 | Crasser | |
| 7,122,088 B2 * | 10/2006 | Field et al. | 156/73.5 |

FOREIGN PATENT DOCUMENTS

| | | |
|---|---|---|
| DE | 19938099 A1 | 2/2001 |
| EP | 1447167 | 8/2004 |
| WO | WO 2005/009663 | 2/2005 |
| WO | WO 2005/009664 | 2/2005 |

OTHER PUBLICATIONS

Translation of International Search Report mailed Jul. 16, 2009 (9 pages).

* cited by examiner

*Primary Examiner* — James Sells
(74) *Attorney, Agent, or Firm* — Hiscock & Barclay, LLP

(57) ABSTRACT

A method and an apparatus are described for the production of a mitered corner joint between parts of a frame, by vibration welding. During the welding procedure, in each case two parts of a frame are displaced by oscillatory heads into mutually perpendicular straight-line translatorial oscillations, the phases of which have been matched to one another in such a way that mitered areas of the two parts of the frame oscillate perpendicularly with respect to a stationary mitered plane and through the same, while the mitered area is retained under a prescribed welding pressure in the system. The method and the apparatus can be used for the simultaneous production of the four corner joints of a frame, in particular of a frame of the moveable or fixed part of windows or of doors. For this, at least four, and preferably eight, oscillatory heads, which displace the parts of the frame into the translatorial oscillations, are synchronized in such a way that their frequencies and amplitudes are the same.

13 Claims, 3 Drawing Sheets

8,066,835 B2

METHOD AND APPARATUS FOR THE PRODUCTION OF MITERED CORNER JOINTS BY VIBRATION WELDING

BACKGROUND OF THE INVENTION

The present invention relates to a method and an apparatus for the production of mitered corner joints between two components by vibration welding.

Vibration welding methods for the production of mitered corner joints between frame parts of a rectangular frame, in particular, of a casement frame for windows and doors, are known from the patents EP 1 207 994 B1, EP 1 447 167 A1, EP 1 648 648 A1 and EP 1 656 231 A1. With these vibration welding methods, the frame parts are set into oscillation by the oscillating heads of the vibration welding machines in such a way that the mutually contacting miter areas oscillate in the fixed miter plane (joint plane) oppositely phased under welding pressure in order to incur a frictional welding connection. These oppositely phased oscillations of the mutually contacting miter areas are orbital movements, for example, circular or elliptical movements, which in the extreme case can also be straight-line movements. Because these movements occur in the fixed miter planes, and thus, obliquely to the longitudinal direction of the frame parts, the oscillating heads must also be disposed obliquely to the longitudinal and transverse direction of the frame parts.

From these publications it is further known to produce the four mitered corner joints of a frame simultaneously, in that eight oscillating heads disposed at the corner areas of the frame are driven synchronously.

A similar vibration welding method for producing corner joints of a frame is known from DE 199 38 099 A1, wherein the frame parts are set into linear oscillations perpendicular to the frame plane, in order to rub, and thereby, to weld together the mutually contacting miter areas of the frame parts. With this vibration welding method, as well, the relative movements of the mutually contacting miter areas of the frame parts occur in the fixed miter planes at the four corners of the frame.

SUMMARY OF THE INVENTION

The object of the present invention is to provide a method and an apparatus for producing a mitered corner joint between two components by vibration welding, in which the oscillation mode of the oscillations of the components, necessary for producing the welded connections, is as simple as possible.

The method and the apparatus according to the invention for solving this objective are defined in Patent Claim 1 and Patent Claim 6.

According to the invention, during the welding process the two components are set into mutually perpendicular straight-line translational oscillations, whose phases are matched to each other in such a way that the miter areas of the two components oscillate at right angles to the fixed miter plane, and through the same, while they remain in contact under a prescribed welding pressure.

Here, the translational oscillations of the two components are expediently synchronized in such a way that their frequencies and amplitudes are identical.

If the method according to the invention is used to produce corner joints between components whose longitudinal extent is greater than their transverse extent, then the translational oscillations of the two components can proceed either in their longitudinal directions or in their transverse directions.

An essential advantage of the invention consists in that the components to be joined together are set solely in straight-line translational oscillations, which correspondingly simplifies the design and the arrangement of the oscillating heads required for this.

With the method according to the invention, the welding pressure necessary for producing the welded connection is produced in that a force is exerted on each of the components, which is applied perpendicularly to the oscillation direction of the respective component. These forces are expediently transferred into the oscillating components via the oscillating heads.

The method and the apparatus according to the invention are particularly suited to produce mitered corner joints of a rectangular frame, such as of a casement frame or a fixed frame for windows, doors, jalousies, or the like. In principle, however, the invention can be used anywhere, where two or more components are to be joined together at miter areas, for example, in the assembly of furniture.

Further advantageous embodiments of the invention arise from the dependent patent claims.

BRIEF DESCRIPTION OF THE DRAWINGS

Further details and advantages of the present invention are explained based on the accompanying drawings. They show.

DETAILED DESCRIPTION OF THE PREFERRED EXEMPLARY EMBODIMENTS

Figure 1:
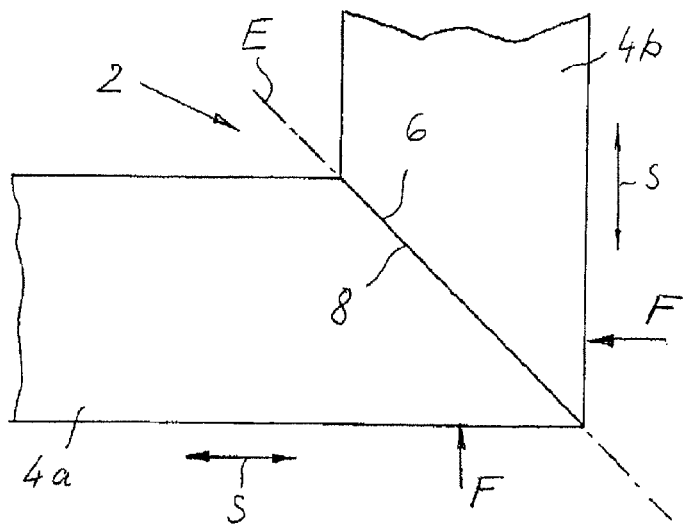
FIGS. 1 to 3 schematic representations of a mitered corner joint in different positions during a welding operation.

FIG. 1 shows schematically a mitered corner joint 2 between two components 4a, 4b, whose miter areas 6, 8 are to be connected together by vibration welding. In the represented exemplary embodiment, the components 4a, 4b are designed as frame parts of a rectangular frame, the rest of which is not represented. As already explained at the outset, the components 4a, 4b can also be any other components, as long as they can be joined together by vibration welding.

The components 4a, 4b are composed of plastic or any other material that is suited for the vibration welding. Possibilities here include, for example, wood and a composite of wood and plastic. Material pairings suited for vibration welding are known in the state of the art, so that they are not discussed further here.

As shown in FIG. 1, the mutually contacting miter areas 6, 8 of the frame parts 4a, 4b are arranged before the welding procedure in an (imaginary) miter plane E. In the represented exemplary embodiment, the miter areas 6, 8 and thus, the miter plane E, respectively, enclose a miter angle of 45° with the longitudinal direction of the frame parts 4a, 4b. However, the miter angle can also be different than 45°, as long as the miter areas 6, 8 extend obliquely to the longitudinal direction of the associated frame part 4a, 4b.

In order to join the frame parts 4a, 4b together at their miter areas 6, 8 by vibration welding, the frame parts 4a, 4b are set into straight-line translational oscillations. As indicated by the double arrows S, the translational oscillations proceed in the longitudinal direction of the frame parts 4a, 4b, and thus, parallel to the frame plane (drawing plane of FIG. 1). This means that the frame part 4a (in FIG. 1) oscillates in the horizontal direction, whereas the frame part 4b (in FIG. 1) oscillates in the vertical direction.

Figure 2:
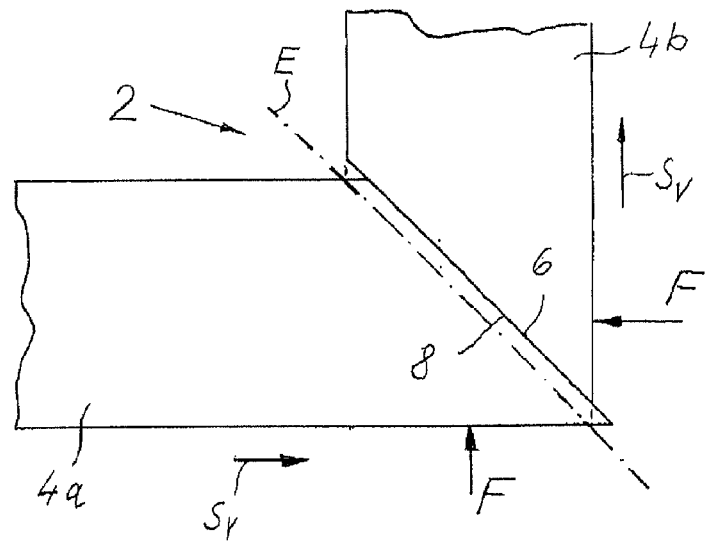
Figure 3:
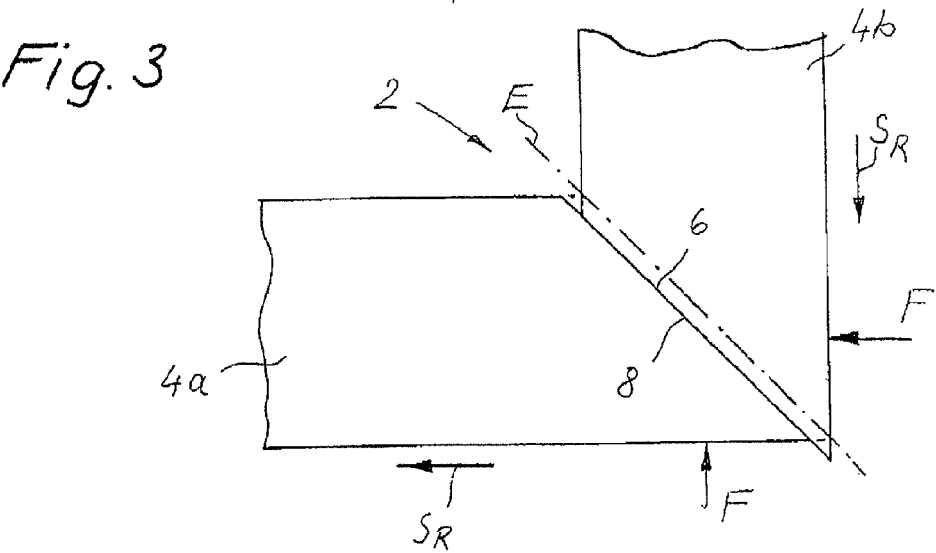

The FIGS. 2 and 3 show the position of the frame parts 4a, 4b during their oscillations in the one oscillation direction $S_V$ and the other oscillation direction $S_R$. In FIG. 2, it can be seen that the frame parts 4a, 4b have slid linearly in the oscillation direction $S_V$ so that their miter areas 6, 8 have moved transverse to the (imaginary) fixed miter plane E up to an end position. With the reversal of the oscillation, the frame parts 4a, 4b slide linearly in the oscillation direction $S_R$, such that their miter areas 6, 8 move through the fixed miter plane E, until they reach the end position lying on the other side of the miter plane E, as is shown in FIG. 3.

These linear translational oscillations of the frame parts 4a, 4b occur with the same amplitude and the same frequency. Here, the phases of the oscillations are matched to each other such that the miter areas 6, 8 of the frame parts 4a, 4b remain in contact, this means that the miter area 6 always oscillates in the same direction as the miter area 8. Here, the miter areas 6, 8 perform a sliding movement relative to each other, parallel to the fixed miter plane E, as is seen in a comparison of the FIGS. 2 and 3. This sliding movement of the miter areas 6, 8 is a requirement for the friction between the frame parts 4a, 4b, necessary for the vibration welding.

In order to create the friction force required for the melting process, the miter areas 6, 8 of the frame parts 4a, 4b are pressed against each other during their oscillations with a prescribed welding pressure. In the represented exemplary embodiment, this is attained in that during the welding process a force F is exerted on each frame parts 4a, 4b whose line of action extends perpendicular, in each case, to the oscillation direction S of the affected frame part 4a or 4b.

The oscillations of the frame parts 4a, 4b should be matched to each other such that after the completion of the oscillation process the frame parts 4a, 4b and their miter areas 6, 8 occupy the end position shown in FIG. 1, in which the miter areas 6, 8 are exactly congruent, that is, their complete surfaces are in contact with each other. With the use of customary linear oscillating heads, this is automatically attained due to the fact that the oscillators of the oscillating heads "settle" in the starting position due to their spring suspension. In principle, this can also be accomplished through a controlled or regulated deceleration of the oscillator.

The oscillation parameters expediently lie in the customary range for linear vibration welding. The following ranges are given as examples:

Oscillation frequency: 40 to 250 Hz (e.g., 100 or 240 Hz)
Oscillation amplitude: 0.35 to 2.0 mm (e.g., 0.6 mm)
Weld time: 1 to 10 s
Weld force: 2.5 to 30 kN With the exemplary embodiment represented in the FIGS. 1 to 3, the frame parts 4a, 4b perform the translational oscillations, in each case, in their longitudinal direction (double arrows S). It should be pointed out, however, that in principle, the same welding method results when the frame parts 4a, 4b do not oscillate in their longitudinal directions, but rather in their transverse directions, thus, perpendicular to the double arrows S. In this case, too, the miter areas 6, 8 perform the sliding motion, relative to each other, parallel to the fixed miter plane E that is necessary for the friction welding procedure, even though the frame parts 4a, 4b are subjected solely to straight-line translational oscillations.

Figure 4:
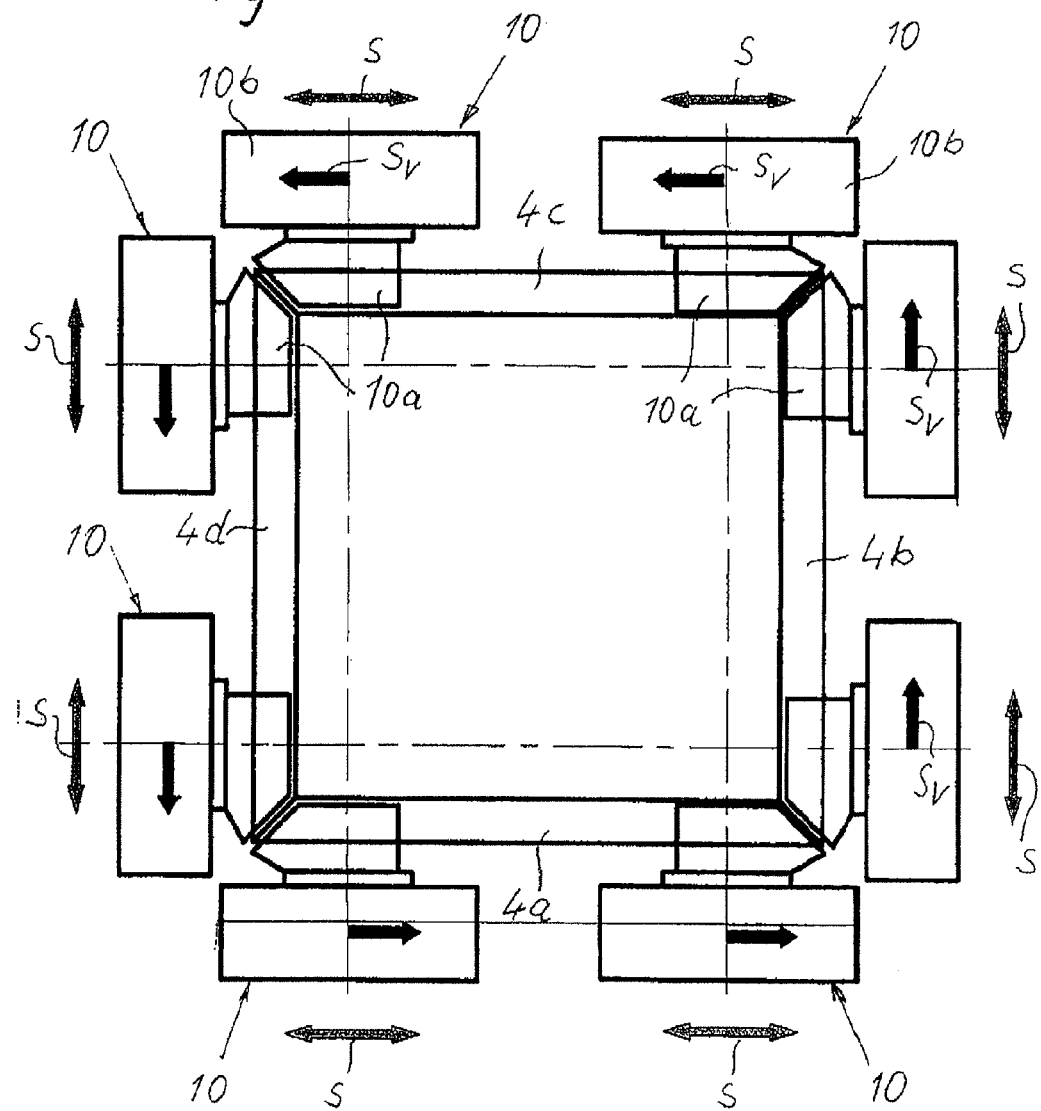
FIG. 4 a schematic top view of a vibration welding system for producing mitered corner joints of a frame consisting of four frame parts.

The described method for producing the mitered corner joint 2 is preferably used for producing complete frames, as described now in more detail based on FIG. 4.

FIG. 4 shows in a schematic representation a vibration welding system for producing a frame from four frame parts 4a, 4b, 4c, 4d, which are connected together by four mitered corner joints 2. The frame is, in particular, a frame for a door or casement window; however, other frames are also conceivable, for example, for furniture, pictures, or the like.

For producing the four mitered corner joints 2, the vibration welding system represented in FIG. 4 comprises eight linearly functioning oscillating heads 10, each of which is composed of an oscillator 10a and a stationary part 10b. The oscillating heads 10 are disposed such that their oscillators 10a, in each case, engage at the end regions of the frame parts 4a-d. Therefore, the oscillators 10a of the oscillating heads 10, and thus, the frame parts 4a-d, can perform linear translational oscillations in their longitudinal directions, as is indicated by the double arrows S, and was previously described based on the FIGS. 1 to 3.

The frame parts 4a-d are held by the oscillators 10a of the oscillating heads 10 through positive locking and/or frictional locking, as is conventional with vibration welding. Frictional locking can be produced, for example, by clamping the frame parts at the oscillators 10a. Positive locking can be attained, for example, in that the oscillators 10a grasp into bores of the frame parts 4a-d by means of finger-like pins, which run transverse to the oscillation direction of the frame parts.

In order to produce the four mitered corner joints 2 of the frame simultaneously, the eight oscillating heads 10 are driven synchronously. This means that the phases of the oscillators of the eight oscillating heads 10 are matched to each other such that their oscillators 10a oscillate in the clockwise direction during their one half period, and counterclockwise during the other half period, as is indicated by the arrows $S_v$ in FIG. 4. In addition, the oscillation frequencies and the oscillation amplitudes of the eight oscillating heads 10 are the same. It is important here that all oscillations of the frame parts 4a-d are purely linearly translational oscillations, such that simple linear oscillating heads can be used.

The welding of the four mitered corner joints 2 can occur without pane, or with a pane inserted in the frame parts 4a-d. The oscillations of the frame parts 4a-d, required for the welding process, relative to an inserted pane can be enabled in that the pane is supported via elastic seals in the frame parts 4a-d. Another possibility consists in that the glass pane is held fixed in position by a robot using a suction cup mounting.

Further, it is possible to simultaneously produce two frames lying upon each other. For this, sixteen individual oscillating heads, or eight double oscillating heads would be necessary. If, in this case, the panes are also already placed inside the frame parts, the lower pane can be supported on a fixed support, and the upper pane can, in turn, be held by a robot using a suction cup mounting (handling system).

In the exemplary embodiment shown in FIG. 4, eight oscillating heads 10 are provided. In principle, it is also possible, to provide only four oscillating heads, which engage in the center regions of the frame parts 4a, 4b, 4c, 4d. Incidentally, the vibration welding system could also be constructed such that the frame parts 4a-d do not oscillate in their longitudinal direction, but rather in their transverse direction, as was already mentioned above. Also in this case, either four or eight oscillating heads could be provided.

The vibration welding system represented in FIG. 4 can be constructed such that it can be used for producing mitered corner joints of different sized frames. A correspondingly constructed vibration welding system is represented schematically in the FIGS. 5 and 6.

Figure 5:
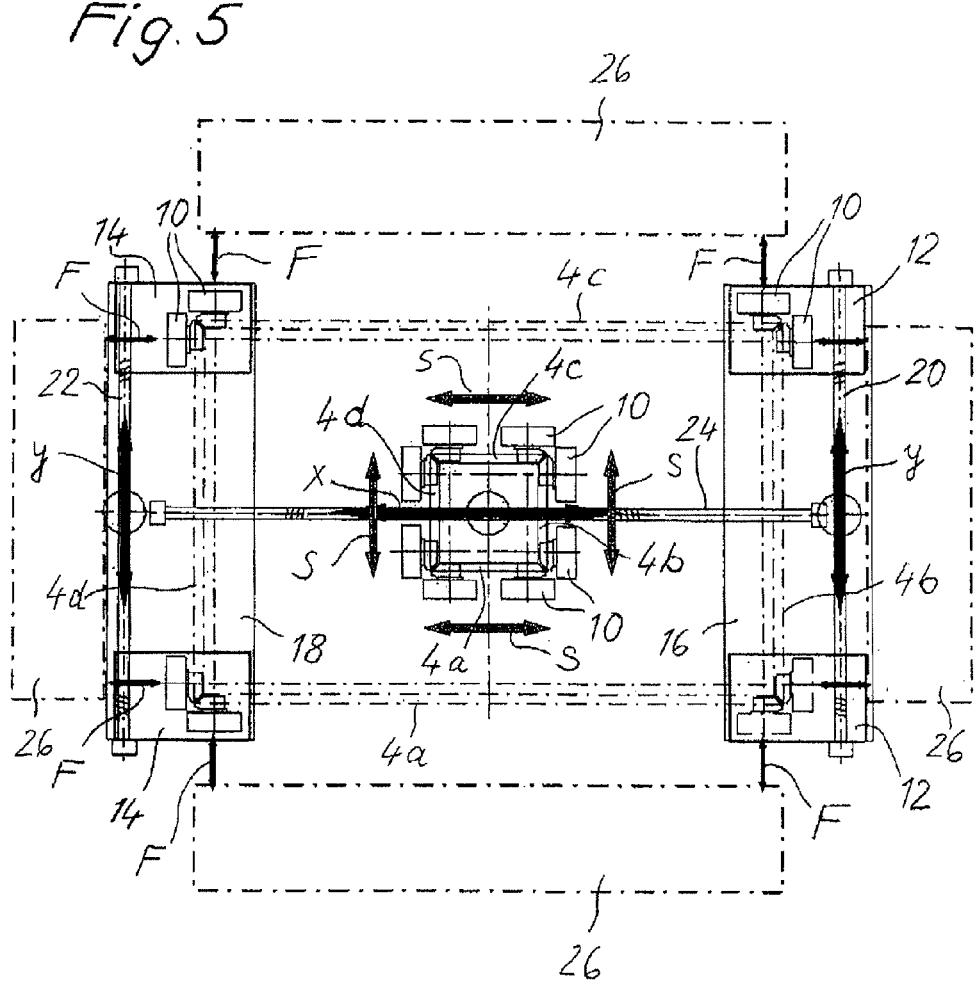
FIG. 5 a representation corresponding to FIG. 4 to illustrate the adjustability of the vibration welding system for processing frames of different sizes.
Figure 6:
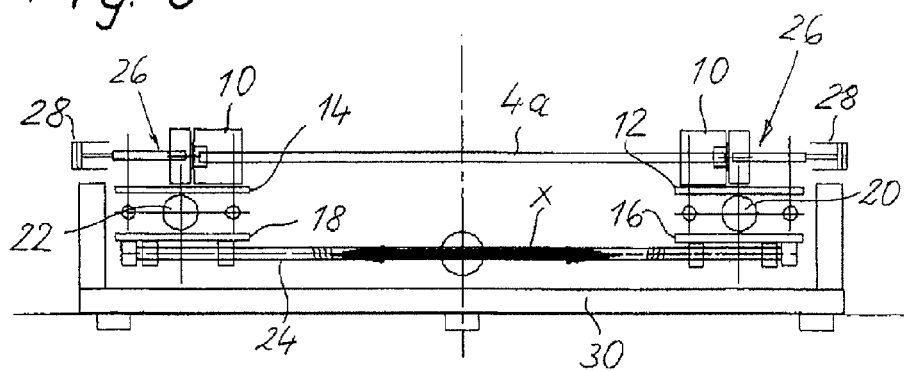
FIG. 6 a schematic side view of the vibration welding system in FIG. 5.

In the center of FIG. 5, a vibration welding system is shown with eight oscillating heads 10 for producing a frame composed of four frame parts 4a-d, corresponding to FIG. 4. Here, the oscillating heads 10 take on positions for welding of the smallest possible frames. In contrast, the largest possible frame that can be produced with the vibration welding system of FIGS. 5, 6 is indicated by dot-dashed lines. The dimensions of the smallest possible frame and the largest possible frame amount to, for example, 400 mm×400 mm and 1000 mm×1000 mm.

In order to be able to weld frames with these different sizes, the eight oscillating heads 10 can be correspondingly adjusted. For this purpose, in each case, two oscillating heads 10 assigned to a corner joint are disposed on an individual carrier plate 12 (right side in FIG. 5) or individual carrier plate 14 (left side in FIG. 5). The individual carrier plates 12, in turn, are slidably supported on a double carrier plate 16, and the individual carrier plates 14 are slidably supported on a double carrier plate 18. In order to be able to displace the individual carrier plates 12 on the double carrier plates 16 in the y-direction (see the double arrow labeled y), an adjustment apparatus 20 is provided that is constructed, for example, as a spindle drive. In the same way, the individual carrier plates 14 can be displaced on the double carrier plates 18 in the y-direction by an adjustment apparatus 22 that is also indicated as a spindle drive.

The two double carrier plates 16, 18 for their part can be displaced in the x-direction (see the double arrow labeled x) relative to each other by a positioning device 24. The positioning device 24 can also be a spindle drive.

Through combined positioning movements of the positioning devices 20, 22 and 24, and thus of the individual carrier plates 12, 14 and double carrier plates 16, 18, the eight oscillating heads 10 can be displaced between the positions shown in FIG. 5, in order to enable the production of corner joints for frames of different sizes.

Further, FIG. 5 indicates in a very schematic manner by dot-dashed lines pressing devices 26, which exert forces F (see the double arrows) on the oscillating heads 10 transverse to their oscillating directions S, in order to create the welding pressure at the miter areas (joint areas) required for the vibration welding procedure. The pressing devices 26 can be, for example, hydraulically or pneumatically actuated adjustment cylinders 28, as is schematically indicated in FIG. 6. The entire vibration welding system is arranged on a U-shaped machine frame 30, which is also indicated schematically in FIG. 6.

The invention claimed is:

1. A method for producing a mitered corner joint between two components by vibration welding, in which mutually contacting miter areas of the two components lie in a common fixed miter plane before the start of the welding process, and during the welding process are rubbed against each other through oscillations of the components under prescribed welding pressure, wherein they remain in contact under the prescribed welding pressure, wherein during the welding process the two components are set into mutually perpendicular straight-line translational oscillations, whose phases are matched to each other so that the miter areas of the two components oscillate transverse to the fixed miter plane, and through the plane.

2. The method according to claim 1, wherein the translational oscillations of the two components are synchronized such that their frequencies and amplitudes are the same.

3. The method according to claim 1 for producing a mitered corner joint between components whose longitudinal extent is larger than their transverse extent, wherein the translational oscillations of the components proceed in their longitudinal directions.

4. The method according to claim 1 for producing a mitered corner joint between components whose longitudinal extent is larger than their transverse extent, wherein the translational oscillations of the components proceed in their transverse directions.

5. The method according to claim 1, wherein the welding pressure is created in that a force, which is applied perpendicularly to the oscillation direction of the respective component, is exerted on each of the components.

6. An apparatus for producing a mitered corner joint between mutually contacting miter areas of two components through vibration welding, with two oscillating heads of a vibration system, which heads are each composed of an oscillator to each hold one component, and a stationary part, wherein the two oscillators can be set into oscillation such that they rub the mutually contacting miter areas against each other under a prescribed welding pressure, wherein the oscillators of the two oscillating heads are disposed relatively to each other such that during the welding process they set the components into mutually perpendicular, straight-line translational oscillations.

7. The apparatus according to claim 6 wherein four mitered corner joints are produced between four frame parts of a frame, such that for creating the translation-shaped oscillations of the four frame parts at least four oscillating heads of a vibration welding system are provided that can be synchronized such that the frequencies and amplitudes of the oscillations are the same.

8. The apparatus according to claim 6, wherein two oscillating heads are provided for each frame part.

9. The apparatus according to claim 6, wherein the oscillating heads can be displaced by positioning devices in order to be able to produce joints for frames of different sizes.

10. The apparatus according to claim 8, wherein the two oscillating heads of each mitered corner joint are supported in each case on one of four individual carrier plates, and that in each case two individual carrier plates are supported on a double carrier plate, wherein the two double carrier plates can be moved relative to each other in a prescribed direction, and the individual carrier plates, in each case, can be moved on the associated double carrier plate relative to each other in a direction, perpendicular to the prescribed direction.

11. The apparatus according to claim 6, further including pressing devices for creating the welding pressure.

12. The apparatus according to claim 6, wherein mitered corner joints of two frames lying upon each another are produced and wherein sixteen individual oscillating heads or eight double oscillating heads are provided that can be synchronized to each other so that the frequencies and amplitudes of the oscillations are the same.

13. The apparatus according to claim 12, wherein during the welding procedure a pane is inserted in each case in the frame parts of the two frames, of which the lower pane is held by a fixed support and the upper pane is held by a fixture of a handling system.

* * * * *